Oct. 21, 1924.
L. D. STOPPEL
1,512,377
ASPARAGUS SLICING AND DICING MACHINE
Filed May 21, 1924    2 Sheets-Sheet 2
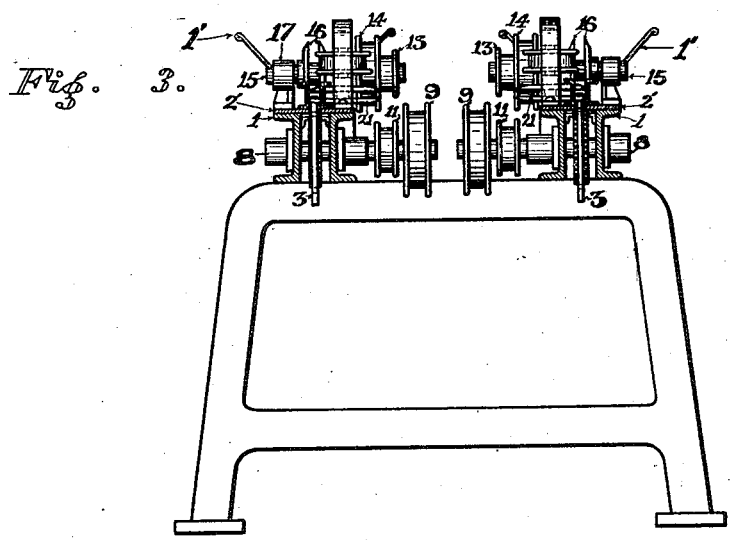
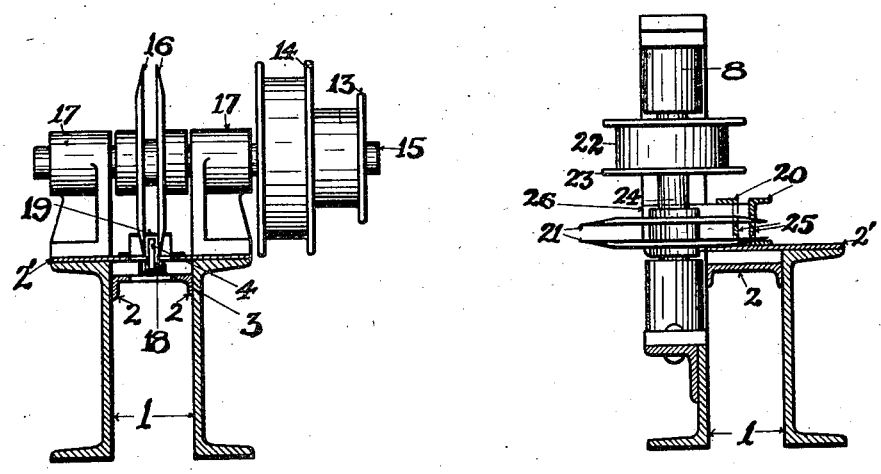
INVENTOR
Louis D. Stoppel
BY
J.E. Trabucco
ATTORNEY Patented Oct. 21, 1924.

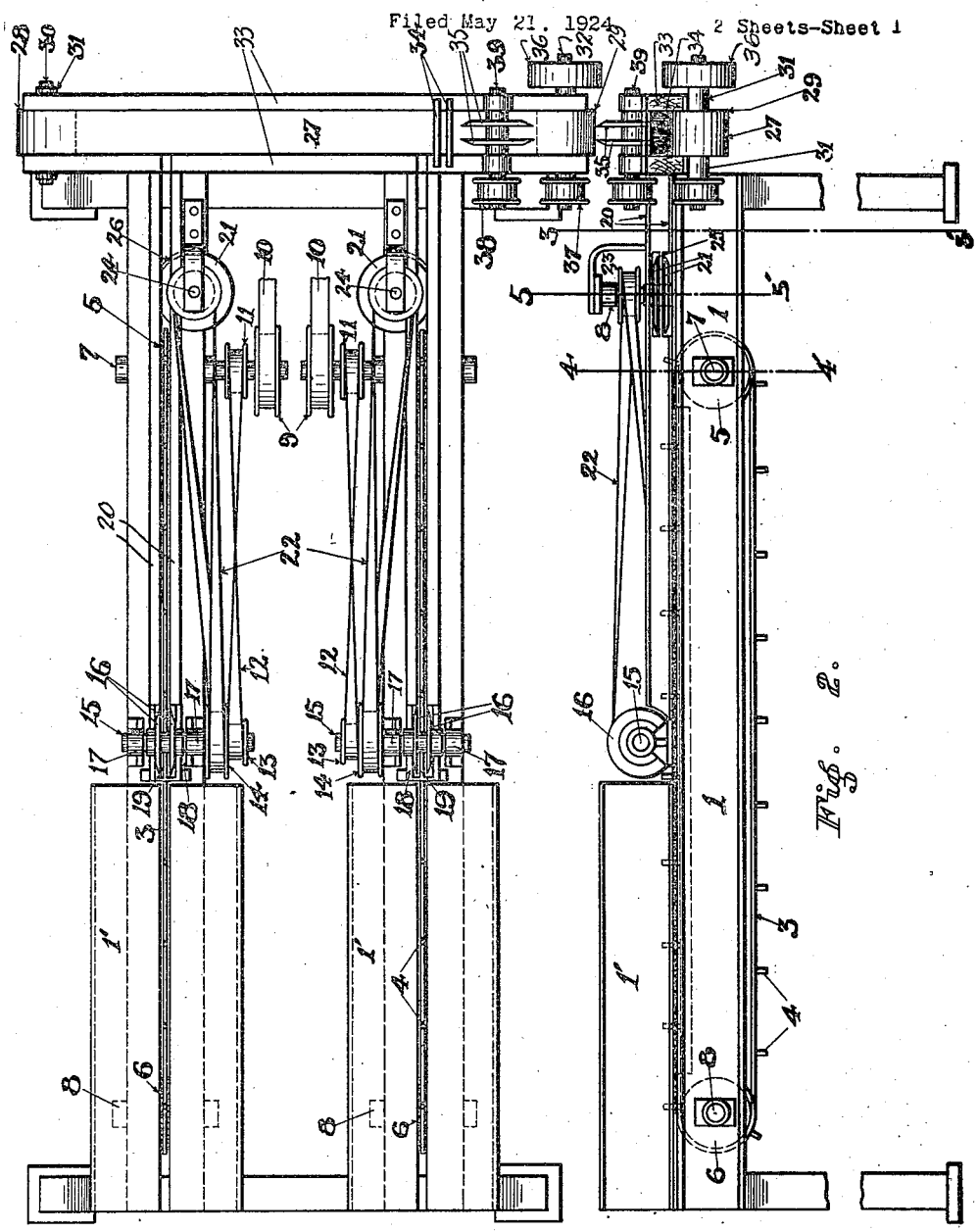

1,512,377

UNITED STATES PATENT OFFICE.

LOUIS D. STOPPEL, OF ISLETON, CALIFORNIA.

ASPARAGUS SLICING AND DICING MACHINE.

Application filed May 21, 1924. Serial No. 714,825.

*To all whom it may concern:*

Be it known that I, LOUIS D. STOPPEL, residing at Isleton, in the county of Sacramento and State of California, have invented new and useful Improvements in Asparagus Slicing and Dicing Machines, of which the following is a specification.

This invention relates to an asparagus slicing and dicing machine in which vertically revolving knives and horizontal revolving knives operate upon asparagus in such a manner as to remove the outer peeling and cut the same into cubes.

It has been the custom heretofore, to cut the tough portions of the asparagus from the tender portions, discard the so-called butts and can the tips. It has been found that by removing the peeling around the butts, the inside portion thereof can be used for various purposes including the making of soups. The present invention includes a machine designed and constructed to both remove the outer skin of the asparagus butts and cut the same into cubes, thereby rendering them suitable for eating purposes.

An object of this invention is to provide a machine of novel design and construction adapted to remove the skin from the tough portions of asparagus stems, and cut them into cubes.

Another object of this invention is to provide a machine of the type just characterized, which said machine is adapted to render the heretofore discarded portions of asparagus stems, suitable for eating purposes.

In the drawings accompanying this specification:

Fig. 1 is a plan view of the asparagus slicing machine;

Fig. 2 is a side elevation view of the same;

Fig. 3 is an end view of the slicing unit of the machine taken on the line 3—3' of Fig. 2;

Fig. 4 is a detail view taken on the line 4—4' of Fig. 2, showing the vertical revolving knives and the means used for operating the same; and Fig. 5 is a detail view taken on the line 5—5' of Fig. 2 showing the horizontal revolving knives and the operating means used therefor.

The drawings show two slicing units, each operated by the same means, and both mounted on a common frame in such a manner that the driving pulleys and belts come on the inside of the machine and away from the side on which the operator stands.

Generally stated the invention consists of a conveyor onto which the asparagus butts are fed by hand, a set of knives which remove the skin from two sides thereof, a separate set of knives which remove the skin from the two other sides, and a means for cutting the squared butts into cubes.

Referring to the drawings, 1 represents channels located back to back and separated by spacers 2. Hoppers designated as 1' are located at the front of the operating mechanism and serve to receive the asparagus butts, allowing them to fall down in position so that they may be carried to the knives. Above these channels are mounted sheet steel plates 2' which serve to make up a table upon which other equipment is mounted. A chain 3 is associated with each slicer, and suitable lugs 4 are attached to the chain with their projections extending outwardly at intervals of approximately seven inches. The chains 3 with the lugs attached thereto move over sprockets 5 and 6. Sprockets 5 are driving sprockets, and 6 are idlers. The chains serve as conveyors for the asparagus butts which are fed thereon by hand, and the lugs serve to force the said butts into connection with the knives. The sprockets 5 and 6 are fastened to shafts 7 and 7' respectively and these shafts revolve on bearings 8. On one end of shaft 7 is fitted a pulley 9 which receives its power through a belt 10 that is operated by any suitable means such as a motor. On shaft 7 is fitted another pulley 11, which together with sprocket 5 and chain 3 are moved by said shaft 7. Belt 12 runs from pulley 11 to another pulley 13 which is integrally connected with pulley 14, both being securely fastened to shaft 15. The belt 12 driving the pulley 13 revolves the shaft 15 on which is fitted a pair of vertical knives 16 of approximately six inches in diameter. The direction of rotation of the knives 16 is the same as the direction of travel of the chain 3, and the peripheral speed of knives 16 is greater than the lineal speed of chain 3. Shaft 15, on which pulleys 13 and 14 and knives 16 are fastened, revolves in bearings 17 that are fastened to plates 2'. There is a suitable opening in plates 2' for the projection of knives 16. The openings in the said plates are so arranged that the asparagus butts are moved along on chain 3 and pushed through the aperture between knives 16 by lugs 4, and are cut by said knives in such a manner that the skin on two sides is removed. The removed skin or peeling drops through a hole 18 in the table. Between the knives 16, is located a spring clip 19, the function of which is to engage the asparagus butts passing between knives 16, prevent the same from adhering to the said knives, and to disengage the butts from the knives and cause them to continue riding on chains 3 by the pressure of lugs 4 against them. At this point the asparagus butts are traveling between two guides, located back to back and designated as 20. The asparagus butts ride through these guides until they reach contact with knives 21, which said knives are at an angle of 90 degrees with reference to knives 16. Pulley 13, as has been stated, is revolving because of the power transferred to it through belt 15, and pulley 14, being intgerally connected with pulley 13, is also revolving. Belt 22 connects pulley 14 with pulley 23 which is fastened to shaft 24 on which knives 21 are also attached. Thus power is transmitted to shaft 24 which revolves knives 21 at a speed slightly faster than the knives 16 revolve. Another spring clip 25 is provided for knives 21, which said clip operates against knives 21 as does clip 19 operate with knives 16. At this point, the remaining two sides of the asparagus butt are peeled, and the peel leaves the butt and travels off through trough 26, the butts continuing through guides 20. A belt 27, operates over pulleys 28 and 29, the former being an idle pulley attached to shaft 30 in bearing 31. Pulley 29 is a driving pulley attached to shaft 32. Wooden guides 33, are located outside belt 27. The peeled asparagus butts leaves the slicing machine through guides 20 and locate on belt 27. In order to properly cube or dice the asparagus butts they should lie across the belt 27, at right angles to the same, so hair brushes 34 are provided on 33, and their function is to secure the right positions before they arrive at knives 35. The knives 35 are similar to the other knives in construction, and are separated by a space suitable to properly cut the asparagus into cubes. The belts and pulleys of the cubing or dicing unit receive their power through pulley 36, which is connected to shaft 32. Pulley 37 is located on shaft 32 and connects with pulley 38 by means of a suitable belt, so as to rotate knives 35 which are attached to shaft 39. The asparagus butts after passing over pulley 29 and upon being cubed or diced, drop into a suitable receptacle.

Having described my invention, what I claim is:

1. An asparagus slicing and dicing machine comprising a frame, a pair of sprocket wheels revolubly secured to the frame, a chain having thereon projecting lugs, located on and connecting said wheels, a pair of vertical revolving knives attached to said frame, a pair of horizontal revolving knives attached to said frame, a means consisting of a series of pulleys and belts for driving said chain and knives, a pair of pulleys attached to the rear end of said frame, a belt located on said pulleys, a pair of revolving knives attached to said frame at the rear end thereof adjacent to said last named belt, and a means for operating said last namel belt and knives.

2. An asparagus slicing and dicing machine comprising a frame, a pair of vertical revolving knives and a pair of horizontal revolving knives secured to said frame, a means comprising an endless chain for conveying asparagus butts to said knives, and a means for operating said knives and chain.

3. An asparagus slicing and dicing machine comprising a frame, a pair of vertical revolving knives and a pair of horizontal revolving knives located on said frame, a means for conveying asparagus butts to said knives consisting of an endless chain attached on a pair of sprocket wheels, a means for operating said knives and chain, a separate set of vertical revolving knives attached to the rear end of said frame, a belt for carrying said asparagus butts to said last named knives, and a means for operating said belt and knives.

4. In a machine of the class described, comprising a pair of vertical revolving knives, a means for delivering asparagus stems to said knives, a pair of horizontal revolving knives, a means for delivering asparagus butts to said horizontal knives and a means associated with said knives for operating them.

5. In a machine of the class described comprising a pair of vertical revolving knives and a pair of horizontal revolving knives for removing the skin from asparagus butts, another pair of vertical revolving knives for cutting the asparagus butts into cubes and a means for operating said knives.

6. In a machine of the class described comprising in combination with an endless chain for conveying asparagus butts, a pair of vertical revolving knives and a pair of horizontal revolving knives for removing the skin from said asparagus butts conveyed to them by said chain, and a means for operating said chain and said knives.

7. In a machine of the class described comprising in combination with a frame, a chain attached to sprocket wheels located on said frame, a set of vertical revolving knives and a set of horizontal revolving knives attached to said frame, a means located on said frame for operating said chain and knives and another set of vertical revolving knives located on said frame at the rear thereof and a separate means for operating said last mentioned knives.

LOUIS D. STOPPEL.